(12) United States Patent
Anderson

(10) Patent No.: US 6,454,293 B1
(45) Date of Patent: Sep. 24, 2002

(54) TRANSPORT CART FOR MEDICAL-RELATED SUPPLIES

(76) Inventor: Greg H. Anderson, 1908 Old Mill Rd., Easley, SC (US) 29642

( * ) Notice: Subject to any disclaimer, the term of this patent is extended or adjusted under 35 U.S.C. 154(b) by 0 days.

(21) Appl. No.: 09/727,412

(22) Filed: Dec. 1, 2000

(51) Int. Cl.⁷ ................................................ B62B 1/00
(52) U.S. Cl. ................... 280/651; 280/655; 280/655.1; 280/47.26
(58) Field of Search ................... 280/651, 654, 280/655, 652, 655.1, 47.26, 47.28, 47.27, 47.35, 42

(56) References Cited

U.S. PATENT DOCUMENTS

| | | | | |
|---|---|---|---|---|
| 2,433,886 A | * | 1/1948 | Bremer | 280/652 |
| 2,901,262 A | * | 8/1959 | Berlin | 280/47.35 |
| 3,168,329 A | * | 2/1965 | Goldschmidt | 280/651 |
| 3,947,054 A | * | 3/1976 | Hall | 280/47.29 |
| 4,062,565 A | * | 12/1977 | Holtz | 280/655 |
| 4,114,965 A | | 9/1978 | Oye et al. | |
| 4,401,319 A | * | 8/1983 | Kazmark | 280/655 |
| 4,526,399 A | * | 7/1985 | Holtz | 280/655 |
| 4,717,168 A | * | 1/1988 | Moon, Sr. | 280/655 |
| 4,746,141 A | * | 5/1988 | Willis | 280/655 |
| 4,754,985 A | * | 7/1988 | Im et al. | 280/655 |
| 4,784,405 A | * | 11/1988 | Stein | 280/655 |
| 4,865,346 A | | 9/1989 | Carlile | |
| 5,072,958 A | * | 12/1991 | Young | 280/655 |
| 5,193,706 A | * | 3/1993 | Hanna et al. | 220/324 |
| 5,240,264 A | | 8/1993 | Williams | |
| 5,326,117 A | | 7/1994 | Cook | |
| 5,468,010 A | * | 11/1995 | Johnson | 280/652 |
| 5,490,688 A | * | 2/1996 | Cheng | 280/655 |
| 5,544,910 A | * | 8/1996 | Esposito | 280/654 |
| 5,558,359 A | * | 9/1996 | Phears | 280/654 |
| 5,626,352 A | * | 5/1997 | Grace | 280/655 |
| 5,680,932 A | * | 10/1997 | Dickinson et al. | 206/372 |
| 5,683,097 A | * | 11/1997 | Fenton et al. | 280/655.1 |
| 5,758,886 A | * | 6/1998 | Mayer | 280/47.26 |
| 5,799,958 A | * | 9/1998 | Bishop | 280/47.26 |
| D399,625 S | * | 10/1998 | Murphy et al. | D34/21 |
| 5,863,055 A | | 1/1999 | Kasravi et al. | |
| D410,578 S | | 6/1999 | Tisbo et al. | |
| 6,000,712 A | * | 12/1999 | Wu | 280/655.1 |
| 6,082,757 A | * | 7/2000 | Lin | 280/654 |
| 6,176,559 B1 | * | 1/2001 | Tiramani et al. | 280/47.26 |
| 6,375,200 B1 | * | 4/2002 | Harter | 280/652 |
| 6,394,471 B1 | * | 5/2002 | Watson | 280/47.26 |

FOREIGN PATENT DOCUMENTS

| | | | | |
|---|---|---|---|---|
| DE | 3627790 A1 | * | 2/1998 | B62B/3/02 |
| GB | 2082513 A | * | 3/1982 | B62B/1/12 |
| GB | 2099766 A | * | 12/1982 | B62B/1/12 |
| GB | 2116489 A | * | 9/1983 | B62B/1/00 |
| GB | 2177354 A | * | 1/1987 | B62B/3/02 |

* cited by examiner

Primary Examiner—Paul N. Dickson
Assistant Examiner—Joselynn Y. Sliteris

(57) ABSTRACT

A transport cart for medical-related supplies for transporting heavy chemotherapy treatment bags from the doctor's office to the home. The transport cart for medical-related supplies includes a lower support assembly including a base frame, and also including wheels being mounted upon the base frame, and further including an upright frame being securely attached to the base frame and extending upwardly therefrom; and also includes an upper support assembly including a support frame being pivotally attached to the upright frame; and further includes a first container assembly being securely mounted upon the lower support assembly; and also includes a second container assembly being securely attached to the upper support assembly.

1 Claim, 3 Drawing Sheets

TRANSPORT CART FOR MEDICAL-RELATED SUPPLIES

BACKGROUND OF THE INVENTION

1. Field of the Invention

The present invention relates to a medical cart and more particularly pertains to a new transport cart for medical-related supplies for transporting heavy chemotherapy treatment bags from the doctor's office to the home.

2. Description of the Prior Art

The use of a medical cart is known in the prior art. More specifically, a medical cart heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,326,117; U.S. Pat. No. 5,863,055; U.S. Pat. No. 4,114,965; U.S. Pat. No. Des. 410,578; U.S. Pat. No. 4,865,346; and U.S. Pat. No. 5,240,264.

While these devices fulfill their respective, particular objectives and requirements, the aforementioned patents do not disclose a new transport cart for medical-related supplies. The inventive device includes a lower support assembly including a base frame, and also including wheels being mounted upon the base frame, and further including an upright frame being securely attached to the base frame and extending upwardly therefrom; and also includes an upper support assembly including a support frame being pivotally attached to the upright frame; and further includes a first container assembly being securely mounted upon the lower support assembly; and also includes a second container assembly being securely attached to the upper support assembly.

In these respects, the transport cart for medical-related supplies according to the present invention substantially departs from the conventional concepts and designs of the prior art, and in so doing provides an apparatus primarily developed for the purpose of transporting heavy chemotherapy treatment bags from the doctor's office to the home.

SUMMARY OF THE INVENTION

In view of the foregoing disadvantages inherent in the known types of medical cart now present in the prior art, the present invention provides a new transport cart for medical-related supplies construction wherein the same can be utilized for transporting heavy chemotherapy treatment bags from the doctor's office to the home.

The general purpose of the present invention, which will be described subsequently in greater detail, is to provide a new transport cart for medical-related supplies which has many of the advantages of the medical cart mentioned heretofore and many novel features that result in a new transport cart for medical-related supplies which is not anticipated, rendered obvious, suggested, or even implied by any of the prior art medical cart, either alone or in any combination thereof.

To attain this, the present invention generally comprises a lower support assembly including a base frame, and also including wheels being mounted upon the base frame, and further including an upright frame being securely attached to the base frame and extending upwardly therefrom; and also includes an upper support assembly including a support frame being pivotally attached to the upright frame; and further includes a first container assembly being securely mounted upon the lower support assembly; and also includes a second container assembly being securely attached to the upper support assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new transport cart for medical-related supplies which has many of the advantages of the medical cart mentioned heretofore and many novel features that result in a new transport cart for medical-related supplies which is not anticipated, rendered obvious, suggested, or even implied by any of the prior art medical cart, either alone or in any combination thereof.

It is another object of the present invention to provide a new transport cart for medical-related supplies which may be easily and efficiently manufactured and marketed.

It is a further object of the present invention to provide a new transport cart for medical-related supplies which is of a durable and reliable construction.

An even further object of the present invention is to provide a new transport cart for medical-related supplies which is susceptible of a low cost of manufacture with regard to both materials and labor, and which accordingly is then susceptible of low prices of sale to the consuming public, thereby making such transport cart for medical-related supplies economically available to the buying public.

Still yet another object of the present invention is to provide a new transport cart for medical-related supplies which provides in the apparatuses and methods of the prior art some of the advantages thereof, while simultaneously overcoming some of the disadvantages normally associated therewith.

Still another object of the present invention is to provide a new transport cart for medical-related supplies for transporting heavy chemotherapy treatment bags from the doctor's office to the home.

Yet another object of the present invention is to provide a new transport cart for medical-related supplies which includes a lower support assembly including a base frame, and also including wheels being mounted upon the base frame, and further including an upright frame being securely attached to the base frame and extending upwardly therefrom; and also includes an upper support assembly including a support frame being pivotally attached to the upright frame; and further includes a first container assembly being securely mounted upon the lower support assembly; and also includes a second container assembly being securely attached to the upper support assembly.

Still yet another object of the present invention is to provide a new transport cart for medical-related supplies that would keep the chemotherapy treatment bags sanitary and free from being punctured Even still another object of the present invention is to provide a new transport cart for medical-related supplies that allows the user to easily move and transport medical supplies from one location to another.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
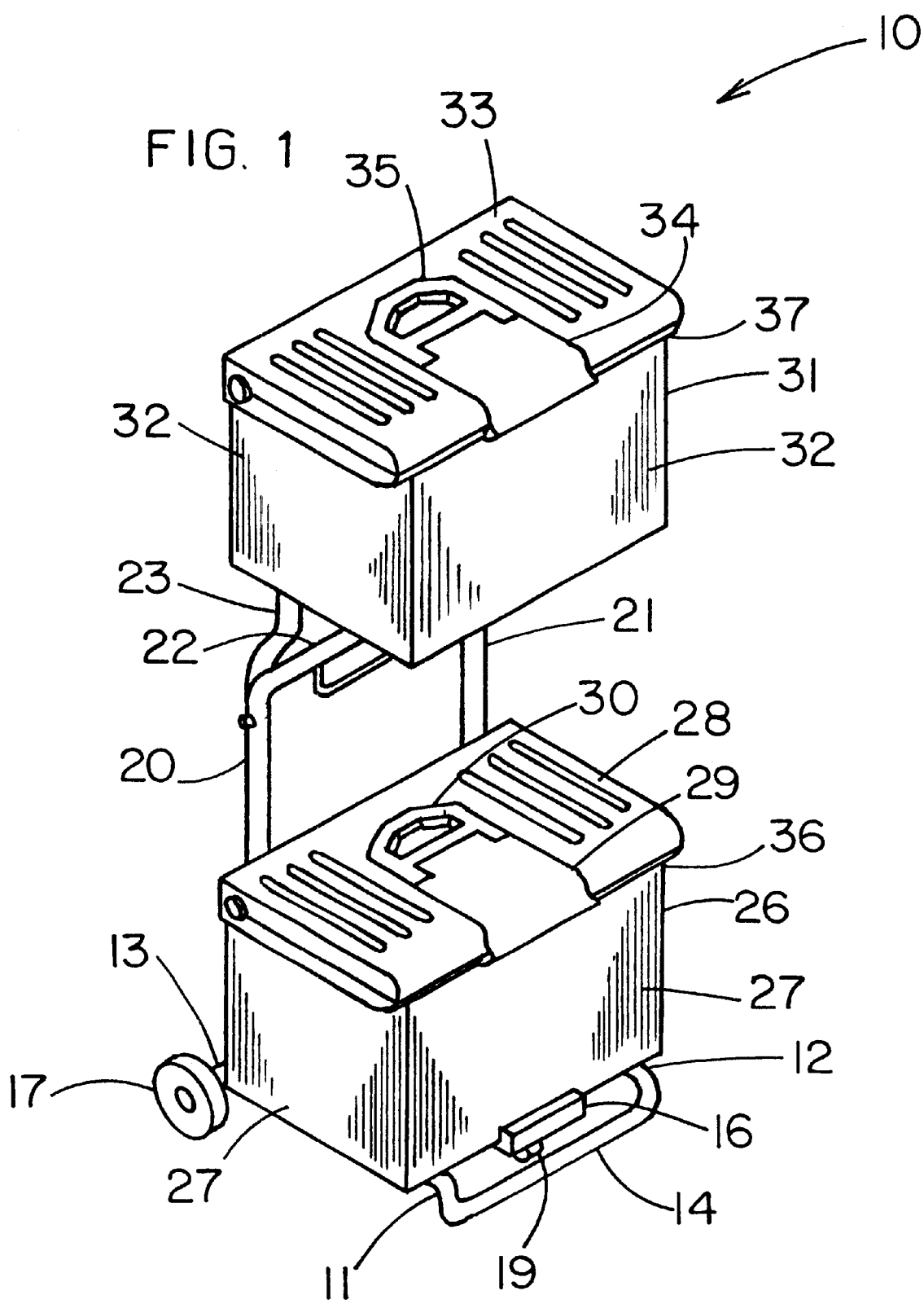
FIG. 1 is a perspective view of a new transport cart for medical-related supplies according to the present invention.
Figure 2:
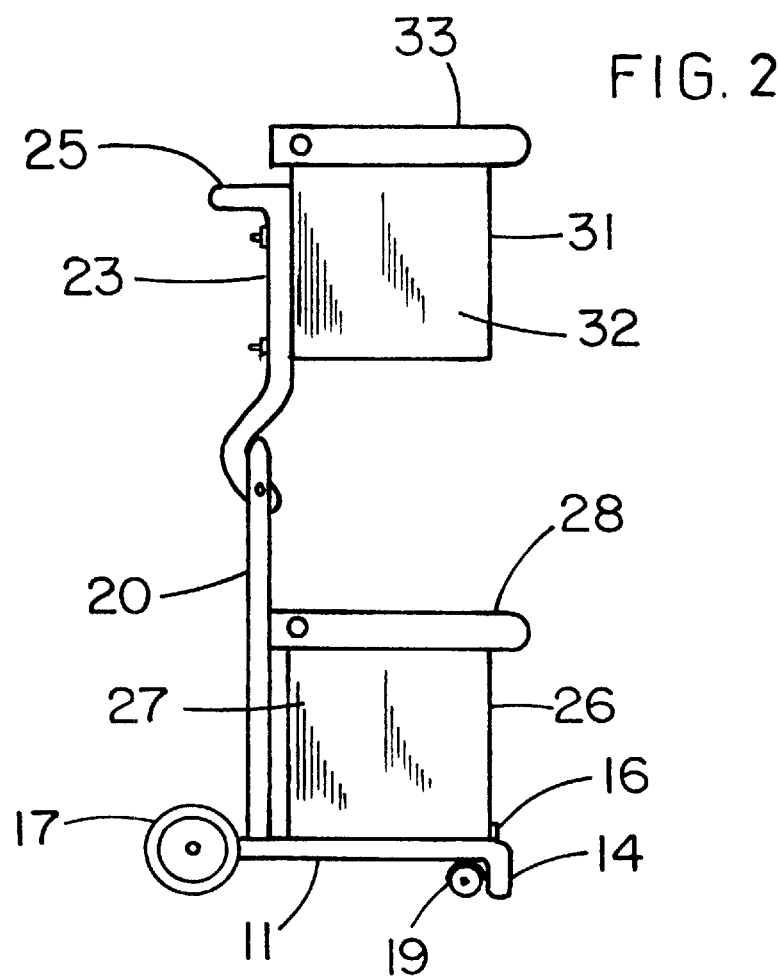
FIG. 2 is a side elevational view of the present invention.
Figure 3:
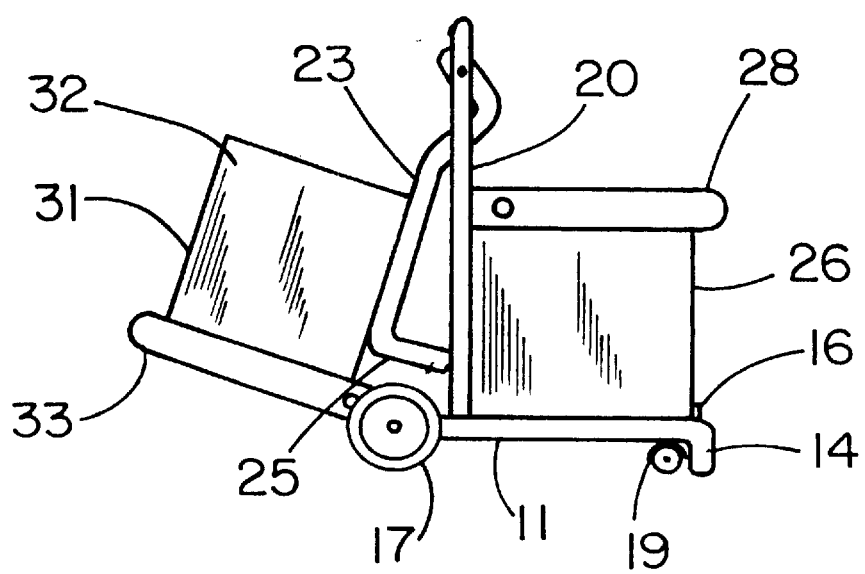
FIG. 3 is a side elevational view of the present invention in a folded position.
Figure 4:
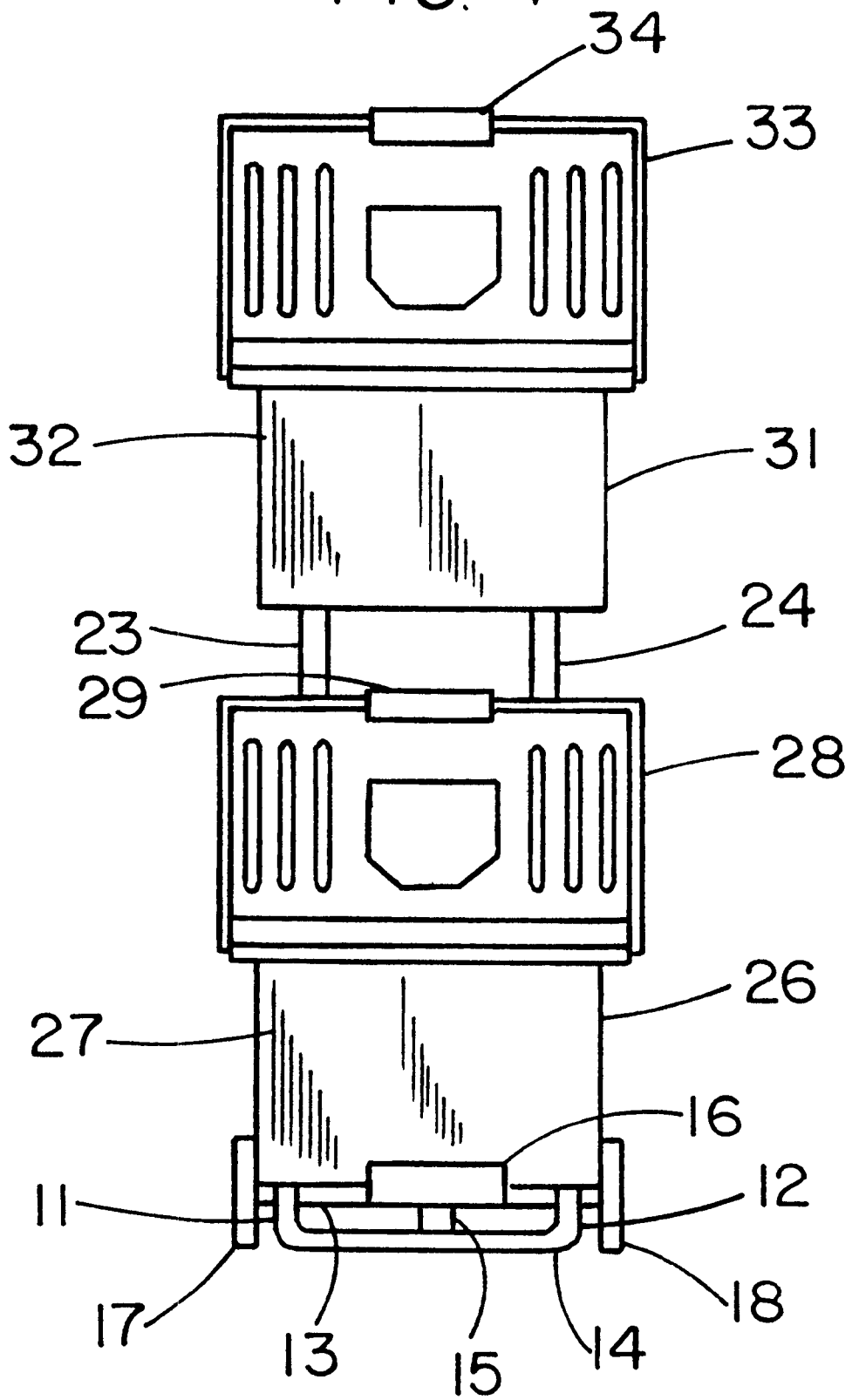
FIG. 4 is a front elevational view of the present invention.

With reference now to the drawings, and in particular to FIGS. 1 through 4 thereof, a new transport cart for medical-related supplies embodying the principles and concepts of the present invention and generally designated by the reference numeral 10 will be described.

As best illustrated in FIGS. 1 through 4, the transport cart for medical-related supplies 10 generally comprises a lower support assembly including a base frame, and also including wheels 17–19 being mounted upon the base frame, and further including an upright frame being securely attached to the base frame and extending upwardly therefrom. The base frame includes a rear axle member 13, and also includes elongate side members 11, 12 being securely and conventionally attached to the rear axle member 13, and further includes an elongate front cross member 14 being integrally attached to the elongate side members 11, 12, and also includes an elongate intermediate member 15 being conventionally disposed between the elongate side members 11, 12, and further includes a container support member 16 being securely and conventionally attached upon the elongate intermediate member 15. The wheels 17–19 include rear wheels 17, 18 which are conventionally mounted to the rear axle member 13, and also include a caster wheel 19 which is conventionally mounted near an end of the elongate intermediate member 15. The upright frame includes elongate side members 20, 21 being securely and conventionally attached to the base frame, and further includes an elongate top cross member 22 being integrally attached to top ends of the elongate side members 20, 21 of the upright frame.

An upper support assembly includes a support frame being pivotally attached to the upright frame. The support frame includes elongate side members 23, 24 having first ends which are pivotally and conventionally attached to near the top ends of the elongate side members 20, 21 of the upright frame, and further includes an elongate handle member 25 being securely and conventionally attached at second ends of the elongate side members 23, 24 of the support frame. The support frame is pivotally extended upwardly from the upright frame and is foldably lowered onto the upright frame. The elongate side members 23, 24 of the support frame have bottom end portions which are curved to facilitate the support frame being pivotally disposed above the upright frame.

A first container assembly is securely and conventionally mounted upon the lower support assembly. The first container assembly includes a first container 26 having front, back, bottom, and side walls 27, and an open top, and a lip 36 conventionally extending along a top edge of the front wall 27, and being securely and conventionally mounted upon the base frame, and also includes a first lid 28 being hingedly attached to the first container 26 upon the open top thereof, and further includes a first latch member 29 being securely and conventionally attached to the first lid 28 and being adapted to removably engage under the lip 36 of the front wall 27 of the first container 26 to securely fasten the first lid 28 upon the first container 26, and also includes a first handle member 30 being hingedly and conventionally attached to an exterior of a top wall of the first lid 28.

A second container assembly is securely and conventionally attached and fastened with fasteners to the upper support assembly. The second container assembly includes a second container 31 having front, back, bottom, and side walls 32, and an open top, and a lip 37 conventionally extending along a top edge of the front wall 32, and is securely and conventionally mounted to the support frame, and also includes a second lid 33 being hingedly attached to the second container 31 upon the open top thereof, and further includes a second latch member 34 being securely and conventionally attached to the second lid 33 and being adapted to removably engage under the lip 37 of the front wall 32 of the second container 31 to securely fasten the second lid 33 upon the second container 31, and also includes a second handle member 35 being hingedly and conventionally attached to an exterior of a top wall of the second lid 33.

In use, the user extends and secured the support frame above the upright frame with fastening members, and places the treatment bags in the first and second containers 26, 31, and moves the transport cart 10 to the desired location.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A transport cart for medical-related supplies comprising:

lower support assembly including a base frame, and also including wheels being mounted upon said base frame, and further including an upright frame being securely attached to said base frame and extending upwardly therefrom;

an upper support assembly including a support frame being pivotally attached to said upright frame, said upper support assembly being pivotable between a first position and a second position, said first position being characterized by said upper support assembly extending upwardly from said lower support assembly in a substantially common plane with said lower support assembly, said second position being characterized by said upper support assembly being rotated into a position substantially adjacent to said lower support assembly;

a first container assembly being securely mounted upon said lower support assembly; and a second container assembly being securely attached to said upper support assembly, said second container assembly having an opening and a lid for selectively closing said opening;

wherein in said first position of said upper support assembly, said second container assembly is positioned above said first container assembly with said opening being oriented upwardly, and, in said second position of said upper support assembly, said second container assembly is positioned adjacent to said first container assembly and said opening of said second container assembly is oriented downwardly;

wherein said base frame includes a rear axle member, and also includes elongate side members being securely attached to said rear axle member, and further includes an elongate front cross member being integrally attached to said elongate side members, and also includes an elongate intermediate member being disposed between said elongate side members, and further includes a container support member being securely attached upon said elongate intermediate member;

wherein said wheels includes rear wheels which are mounted to said rear axle member, and also includes a caster wheel which is mounted near an end of said elongate intermediate member;

wherein said upright frame includes elongate side members being securely attached to said base frame, and further includes an elongate top cross member being integrally attached to top ends of said elongate side members of said upright frame;

wherein said support frame includes elongate side members having first ends which are pivotally attached to near said top ends of said elongate side members of said upright frame, and further includes an elongate handle member being securely attached at second ends of said elongate side members of said support frame;

wherein said elongate side members of said support frame have bottom end portions which are curved to facilitate said support frame being pivotally disposed above said upright frame when said upper support assembly is in said first position;

wherein said second container assembly includes a second container having front, back, bottom, and side walls, and an open top, and a lip extending along a top edge of said front wall, and being securely mounted to said support frame, and includes a second latch member being securely attached to said second lid and being adapted to removably engage under said lip of said front wall of said second container to securely fasten said second lid upon said second container, and also includes a second handle member being hingedly attached to an exterior of a top wall of said second lid;

wherein said first container assembly includes a first container having front, back, bottom, and side walls, and an open top, and a lip extending along a top edge of said front wall, and being securely mounted upon said base frame, and also includes a first lid being hingedly attached to said first container upon said open top thereof, and further includes a first latch member being securely attached to said first lid and being adapted to removably engage about said lip of said front wall of said first container to securely fasten said first lid under said first container, and also includes a first handle member being hingedly attached to an exterior of a top wall of said first lid;

wherein, in said second position of said upper support assembly, said second container is located on an opposite side of said rear axle with respect to said first container; and wherein said handle member extends rearwardly in said first position of said upper support assembly and is positioned between said second container and said lower support assembly when said upper support assembly is in said second position for spacing said second container from said first container.

* * * * *